United States Patent
Whitham et al.

(10) Patent No.: US 6,365,718 B1
(45) Date of Patent: Apr. 2, 2002

(54) DYE COMPOSITION

(75) Inventors: Christopher Whitham, Barnsley; Alan John Buckley, Grasscroft; Rebecca Jane Crowson, Burley, all of (GB)

(73) Assignee: Yorkshire Chemicals PLC, Leeds (GB)

( * ) Notice: Subject to any disclaimer, the term of this patent is extended or adjusted under 35 U.S.C. 154(b) by 0 days.

(21) Appl. No.: 09/646,803

(22) PCT Filed: Jan. 20, 2000

(86) PCT No.: PCT/GB00/00119

§ 371 Date: Sep. 22, 2000

§ 102(e) Date: Sep. 22, 2000

(87) PCT Pub. No.: WO00/43454

PCT Pub. Date: Jul. 27, 2000

(30) Foreign Application Priority Data

Jan. 22, 1999 (GB) ................................................ 9901303

(51) Int. Cl.[7] ........................ C09B 67/22; C09B 29/045; D06P 3/42

(52) U.S. Cl. ............................................. 534/575; 8/639

(58) Field of Search ............................... 534/575; 8/639

(56) References Cited

U.S. PATENT DOCUMENTS

| 3,995,994 A | | 12/1976 | Greenhalgh et al. ............. 8/26 |
| 4,211,696 A | * | 7/1980 | Baird et al. .................. 534/731 |

FOREIGN PATENT DOCUMENTS

| EP | 347 685 | | 12/1989 |
| FR | 2203855 | | 5/1974 |
| GB | 1112146 | | 5/1968 |
| GB | 1394367 | | 5/1975 |
| GB | 1438586 | * | 6/1976 |
| GB | 2030163 | | 4/1980 |
| JP | 10140029 | | 5/1998 |

* cited by examiner

Primary Examiner—Fiona T. Powers
(74) Attorney, Agent, or Firm—Lahive & Cockfield, LLP

(57) ABSTRACT

The invention provides a dye composition for dyeing fibers comprising (a) an azo dye of formula (II) or a salt thereof, and (b) an azo dye of formula (III) or a salt thereof. The invention provides navy and black dye compositions, especially suitable for dyeing secondary cellulose acetate fibers, with superior fastness properties than known navy/black dyes. Preferably, the α-crystal form of dye (III) is used, which has greater solubility and achieves quicker dyeing than the commonly-used β and γ forms of (III) when dyeing cellulose acetate at 60–95° C. A new method of making the α form is disclosed.

29 Claims, No Drawings

DYE COMPOSITION

The present invention relates to novel dye compositions for dyeing cellulose acetate fibres, especially secondary acetate fibres and blends of secondary acetate fibres with other fibres both natural and synthetic.

Mixtures of disperse dyes are well known for the dyeing of synthetic fibres, particularly for polyester and for secondary celulose acetate fibres and their blends with other fibres. Polyester fibres in particular are well served both in the inventive art of, and in the commercial availability of, disperse dye mixtures which provide navy and black shades with good application properties and good fastness to washing and to light. Many such mixtures based upon the mixture of two or more dyes of general structure (I), where X may be hydrogen or alkoxy, and R and R' may be alkl or alkenyl. Such mixtures are exemplified in, for example U.S. Pat. No. 5,393,308 (to BASF) and GB 1,582,743 (to ICI), and commercially provide economic navy and black shades of adequate fastness when applied to polyester.

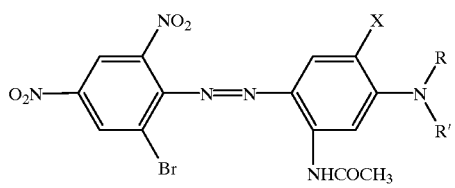

(I)

These mixtures, and many other mixtures which are based upon high energy dyes, are however unsuitable for the dyeing of secondary cellulose acetate.

It is an object of the present invention to provide novel disperse dye mixtures, based upon known dyes, which are especially suitable for the dyeing of secondary cellulose acetate.

Secondary cellulose acetate fibres are commonly used as linings on coats and suits. Dyeing of the fibres usually takes place at less than 100° C. at atmospheric pressure in water. The main commercial acetate fibre dyes are black. However, very few companies offer good black dyes for acetate fibres.

Dyes of formula (II) and (III), as identified hereafter, are previously known dyes for the dyeing of synthetic fibres. The preparation of dye (II), and the use of the dye in the coloration of aromatic polyester textile materials is exemplified in example 1 of UK patent 1,394,367 (ICI). Commercial preparations of the dye are available and recommended for use on polyester fibres as Dispersol Blue XF (trade mark BASF) and Serilene Blue HWF (trade mark Yorkshire Chemicals). However, dye (II) has never to the applicant's knowledge been used on acetate fibres before.

Dye (III) is disclosed in claim 5 and page 10 of UK Patent 1,112,146 (BASF) and is commercially available and recommended for use on polyester fibres as Palanil Dark Blue 3RT (trade mark BASF) and Serilene Dark Blue RT-LS (trade mark Yorkshire Chemicals). Two new (β- and γ-) crystal forms of dye (III) are disclosed in UK patent 1,438,586 (BASF).

No previous use of the dyes (II) and (III) in admixture for the coloration of textiles has been found, and there is no suggestion in the prior art that (II) and (III) should be combined.

According to a first aspect of the present invention there is provided a dye composition for dyeing fibres comprising (a) an azo dye of the formula (II):

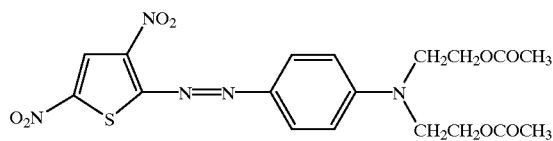

(II)

or a salt thereof, and (b) an azo dye of the formula (II):

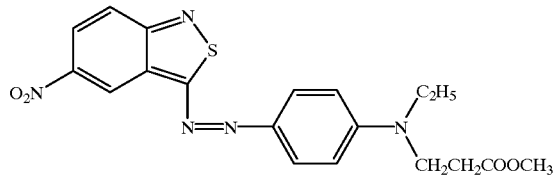

(III)

or a salt thereof.

When referring to dyes (II) and (III) throughout the specification, the salts thereof are intended to be included. The same applies for dyes (IV) to (IX) define hereinafter.

The dye composition of the present invention is blue, and can form the basis of navy and black dye compositions for providing navy or black shades on, for example, secondary cellulose acetate fibres.

The dye composition is especially suitable for dyeing secondary cellulose acetate fibres. From the resultant dyeings, it has been found that the dye compositions of the present invention display fastness properties superior to those provided by dye compositions currently available for the provision of navy and black shades on secondary cellulose acetate. This superior fastness extends to blends of secondary cellulose acetate with other fibres, for instance with wool, viscose fibres and synthetic elastomeric fibres.

The exact shade achieved by the blue mixture or composition of the present invention may be changed by varying the proportions of the two dyes, and may be varied further by the addition of one or more further blue dyes to the dye composition.

Preferably, the dye composition comprises from 20% to 80% of dye (II) and from 20% to 80% of dye (III), by weight of the total amount of dyes (II) and (III) in the composition.

The BASF inventors of UK patent 1,438,586 claim that the β- and γ-forms or modifications of the dye (III) disclosed therein have better stability under liquor dyeing conditions (100–200° C., eg. up to 140° C.) and better rheological properties than the α-form (crystal form) or α-modification of dye (III), which was previously known for dyeing of polyester and cellulose acetate. However, the present inventor has now found that, contrary to the indications in GB 1,438,586, the α-form is actually superior for dyeing cellulose acetate (eg. secondary acetate) fibres giving a better rate of dyeing than the β- and γ-forms of dye (III), so that a shorter time is required in the dye bath, and producing a more on-tone build up of the required navy or black shade on the fibres. Without being bound by theory, this quicker dyeing is thought to be because the α- form of dye (III) has a greater solubility than the β- and γ-forms in the dye bath at typical acetate dyeing temperatures of about 75–85° C. This increased solubility in turn is probably because the α-form of (III) is less thermodynamically stable and has a lower melting point and crystal energy than the β- and γ-forms.

The α-form of dye (III) has an X-ray diffraction graph (CuK$_\alpha$radiation) having a characteristic line of strong intensity at a diffraction angle 2θ of 25.50°, and lines of medium intensity at diffraction angles of 5.9°, 12.1°, 13°, 14.2°, 15.9°, 17.8°, 18.4°, 24.1°, 26° and 28°.

Therefore, in a particularly preferred embodiment of the present invention, some or all of the dye (III) is present in an α- form characterised substantially by the above X-ray diffraction graph. Preferably ≧50%, more preferably ≧80%, even more preferably≧95% and most preferably 100% of the dye (III) is present in the α-form.

Alternatively, the dye (III) can comprise or can be present in, or some or all of the dye (III) can be present in, the β-form and/or the γ=form of dye (III). The β- and γ-crystal forms of dye (III) are disclosed in UK patent 1,438,586, and are characterised substantially by x-ray diffraction graphs (CuK$_α$ radiation) as follows:

β-form: line of strong intensity at a diffraction angle 2θ [°] of 25.3; lines of medium intensity at diffraction angles 2θ [°] of 7.3, 13.6, 13.9, 16.7, 21.1, 23.1 and 29.0; and optionally lines of weak intensity at diffraction angles 2θ [°] of 14.3, 18.3, 19.8, 22.6 and 26.1. γ-form: line of strong intensity at a diffraction angle 2θ [°] of 24.5; lines of medium intensity at diffraction angles 2θ [°] of 10.9, 18.3 and 22.3; and optionally lines of weak intensity at diffraction angles 2θ [°] of 9.0, 17.8, 20.8, 23.2, 26.2, 27.6 and 28.0.

Optionally, the dye composition additionally comprises an azo dye of the formula (VI) and/or an azo dye of the formula (IX):

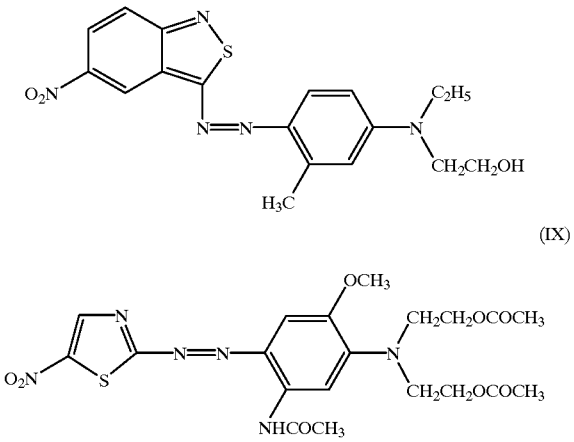

or one or more salts thereof.

The dyes (VI) and (IX) are also blue and further vary the shade achieved by a basic blue composition containing dyes (II), (III) and [(VI) and/or (IX)] and no other dyes.

Preferably, the dye composition comprises from 20% to 70%, or more preferably from 30% to 60%, of dye (VI) or of dye (IX) or of the total weight of dyes (VI) and (IX), by weight of the total weight of dye (II) and dye (III) in the composition.

Other blue dyes may also be used in addition to or instead of dyes (VI) and (IX), and may be present in the same proportions as those preferred for (VI) and/or (IX).

Preferably, the dye composition comprises one or more additional dyes (preferably azo dyes) adapted to give the dye composition and/or fibres with which the composition comes into contact a black shade These dyes can include (i) yellow dyes, (ii) yellow-brown or brown dyes, (iii) orange dyes and/or (iv) red dyes, these dyes preferably being suitable for dyeing acetate. These additional dyes can be added to the composition of the invention in a manner familiar to those skilled in the art to convert the blue dye mixture into black mixtures which have superior properties for the dyeing of cellulose acetate fibres (e.g. secondary cellulose acetate fibres). Obviously, the exact tone of the black dye mixture derived, when dyed on cellulose acetate fibres, will depend upon the type, and proportions of the further dyes added.

More preferably, the one or more additional dyes can include the orange dye of formula (IV), the brown dye of formula (V), the red dye of formula (VII) and/or the yellow dye of formula (VIII), and/or a salt or salts thereof.

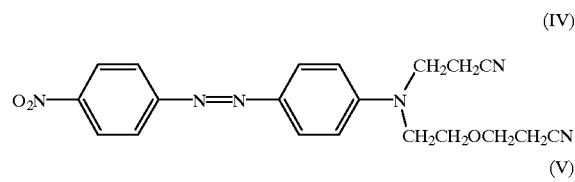

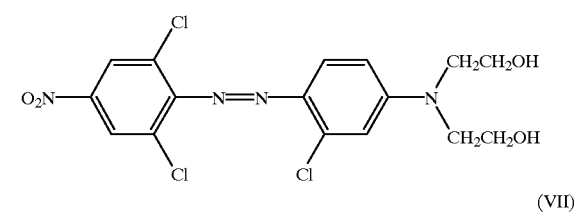

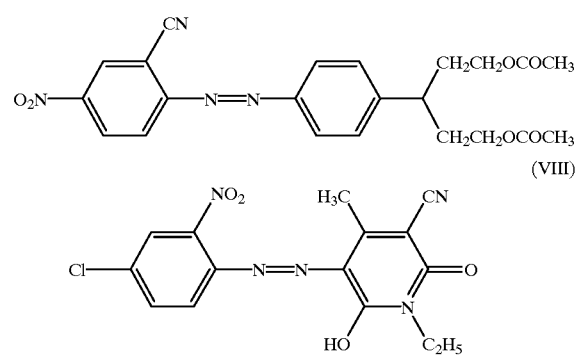

The general principle of producing a black effect by colour mixture is well known, and is described in such texts as "Color—An Introduction to Practice and Principles", author R. G. Kuehni, [John Wiley & Sons Inc., 1997]. The application of this principle to dyestuffs mixtures is also well known, and is exemplified in the previously referenced U.S. Pat. No. 5,393,308 (BASF).

The dye composition preferably contains from 10 to 50% of dyes by weight of the total weight of the dry ingredients of the composition, and/or additionally contains from 50 to 90% of a dispersant or a plurality of dispersants by weight of the dry ingredients of the composition The dye composition may be required either as a solid or a liquid. The composition may thus contain between 0 and 90 wt % water. A lignin sulphonate may be used as a dispersant.

The novel dye compositions may also contain other non-dye components which, typically, enhance the dyeing properties of the dye compositions in the dyeing process. These components include, for example, lignin sulphonates and the products of sulphonation or sulphomethylation of the condensates of formaldehyde with aromatic compounds.

The essential components of the dye composition of the present invention can be prepared and/or obtained commercially as follows. Dyes (II) and (III) are previously known dyes for the dyeing of synthetic fibres. The dye (II) can be prepared by the method exemplified in example 1 of UK patent 1,394,367 (ICI). Commercial preparations of dye (II) are also available and recommended for use on polyester fibres as Dispersol Blue XF (trade mark BASF) and Serilene Blue HWF (trade mark Yorkshire Chemicals plc, Kirstall Road, Leeds, LS3 1LL, United Kingdom). Dye (III) is disclosed in claim 5 and page 10 of UK patent 1,112,146 (BASF) and is commercially available and recommended for use on polyester fibres as Palanil Dark Blue 3RT (trade mark BASF) and Serilene Dark Blue RT-LS (trade mark Yorkshire Chemicals). A prior art synthesis of the α-form of the dye (III) is suggested in German patent No. 1,544,375; and a new improved synthesis is disclosed hereinafter.

The dye compositions may be prepared using conventional methods whereby the individual component dyes may be separately processed with the dispersing agent or agents, followed by the blending of the individually finished dyes in the required ratios. Alternatively, the dyes may be combined in the required proportions prior to processing (e.g. by adding the dispersing agent or agents).

According to a second aspect of the present invention, therefore, there is provided a method of making a dye composition according to the present invention, comprising mixing the dyes together, preferably in the stated weight ratios.

According to a third aspect of the present invention, there is provided a dye bath composition comprising a dye composition according to the present invention and water. Usually, the dye composition is dispersed in the water.

According to a fourth aspect of the present invention, there is provided a method of dyeing fibres comprising contacting fibres with a dye composition or dye bath composition of the present invention in a dye bath.

Preferably, the fibres comprise cellulose acetate fibres (more preferably secondary cellulose acetate fibres) or blends thereof with other natural and/or synthetic fibres such as wool, viscose, and/or synthetic elastomeric fibres.

Preferably, the dye bath is brought to a raised temperature after the fibres have been introduced into the dye bath. Preferably, after the fibres have been introduced into the dye bath, the dye bath is gradually heated to 60–95° C., more preferably to about 75–90° C., even more preferably to about 85° C. In commercial operation the actual dyeing takes place in the jig or jet dyeing machine or the like when the fabric is only wetted with the dye liquor and the actual dyeing probably takes place at a temperature of about 10° C. less than that of the dye bath.

Preferably, the fibres are left in the hot dye bath or machine until dyeing is substantially complete. This may take from one to eight hours depending upon the temperature and the type of machine used. The dye bath is then preferably gradually cooled (usually to 40–70° C.) before removing the fibres, and preferably the fibres are then rinsed. The method is suitable for dyeing fibres in the form of textile fabrics.

The method of dyeing may also comprise later steps (after removing the fibres from the dye bath) of reduction clearing the fibre, rinsing the fibre, drying the fibre, and/or stentering the fibre.

According to a fifth aspect of the present invention there are provided fibres and/or a textile material dyed using a dye composition, dye bath composition and/or method of the present invention. Preferably, the fibres and/or textile material comprise cellulose acetate fibres (more preferably secondary cellulose acetate fibres) or blends thereof with other natural and/or synthetic fibres such as wool, viscose and/or synthetic elastomeric fibres.

According to a sixth aspect of the present invention, there is provided a method of making an α-form of the dye (III) or a salt thereof as defined above, comprising the steps of:

(a) reacting 3-amino-5-nitro-2,1-benzisothiazole or a salt thereof with a diazotising agent, and (b) coupling the diazotised benzothiazole with N-ethyl-N-[2-(methoxycarbonyl)ethyl]aniline or a salt thereof.

Preferably, the diazolising agent comprises nitrosyl sulfuric acid (e.g. formed in situ from sodium nitrite in sulfuric acid)

Preferably step (a) is carried out in a solvent which comprises sulfuric acid (e.g. ≧90% e.g. 95–99% sulfuric acid by weight of water present), and/or at a temperature of −20 to 5° C., more preferably 0 to 5° C. The preferred duration of step (a) is 3 to 4 hours.

Preferably, step (b) is carried out in aqueous medium.

Preferably, in step (b) the diazotised benzothiazole is added gradually (e.g. continually or batchwise) to a reaction vessel containing the N-ethyl-N-[2-(methoxy carbonyl) ethyl] aniline or the salt thereof. Preferably, the temperature is maintained at −10° C. to 10° C., more preferably −5° C. to 0° C., during the gradual addition. The pH is preferably substantially maintained at 3–6, more preferably 4–5, during the gradual addition (e.g. by addition of base or alkali). After the gradual addition, the reaction mixture is acidified and preferably heated to >25° C. More preferably 24 50% for a period of 10 minutes to 3 hours., more preferably for 60 to 90 minutes.

According to a seventh aspect of the present invention, there is provided a method of making a dye composition according to the first aspect of the invention comprising:

a) making an α-form of the dye (III) or a salt thereof as defined above according to the sixth aspect of the present invention, and b) mixing said α-form of dye (III) or salt thereof with one or more dyes including dye (II) or a salt thereof.

EXAMPLES

Specific embodiments of the present invention will now be described, by way of example only. Throughout the examples all parts are parts by weight unless otherwise specified.

Example 1

Basic Composition with Dyes (II) and (III)

A blue dye composition was prepared comprising 57.9 parts of dye (II) with 42.1 parts of dye (III) and 204 parts of a lignin sulphonate dispersing agent. This composition was used to dye a secondary cellulose acetate fabric at 1/1 and 2/1 depths by applying 0.7 wt % and 1.4 wt % of the dye composition by weight of fibre using the following method. The depths of dyeing are defined in British Standard BS2661:SDG:1961 issued by the British Standards Institution in collaboration with the Society of Dyers and Colourists (ISO R105/1).

A 4 g piece of a standard woven secondary cellulose acetate lining fabric was immersed in 80 ml of water containing the dye and 0.8 ml Dyapol BDN (trade mark of and available from Yorkshire Chemicals), a dye bath dispersant. The solution was adjusted to pH 4.5 using dilute acetic acid. The liquors and fabric were heated to 85° C. at 1.5° C./min, and then maintained at 85° C. for an hour. At the end of this period, the dye bath was allowed to cool, and the fabric removed and rinsed with warm water before drying.

The fastnesses of the resultant dyeings were assessed by means of the standard grey scale against Celliton Blue GF (trade mark—BASF) applied to the same depth of shade by the same standard dyeing method. Celliton Blue GF is a blue dye composition which is sold specifically for the dyeing of secondary cellulose acetate fabrics, it being a market leading dye composition in this category. These tests methods are taken from British Standard BS1006:1990 issued by the British Standard Institution.

| CO6 A2S Wash Fastness Test | | | | | | | | | | | | | | |
|---|---|---|---|---|---|---|---|---|---|---|---|---|---|---|
| | 1/1 Depth | | | | | | | 2/1 Depth | | | | | | |
| | CS | CA | Co | Pa | Pes | Pac | Wo | CS | CA | Co | Pa | Pes | Pac | Wo |
| Example 1 | 5 | 4/5 | 5 | 4/5 | 4/5 | 5 | 5 | 5 | 4 | 5 | 4 | 4 | 5 | 5 |
| Celliton Blue GF | 5 | 4 | 5 | 4 | 4/5 | 5 | 5 | 5 | 3/4 | 4/5 | 3/4 | 4 | 5 | 5 |

In brief, this test involves washing the dyed cellulose acetate fabric at 40° C. in the presence of a test fabric comprising strips of various types of undyed fabric, and observing the degree of transfer of dye from the dyed fabric to the undyed fabrics. In the above table, the numbers represent the cross-staining of the dye from the cellulose acetate textile to test strips of:

CA . . . Cellulose Acetate
Co . . . Cotton
Pa . . . Nylon 6.6
Pes . . . Polyester
Pac . . . Acrylic
Wo . . . Wool CS stands for change in shade, i.e. a measure of the colour lost by the dyed acetate fabric during the washing test.

In all cases, the staining is assessed on a 1–5 scale where 5 represents no staining and 1 represents severe staining. Therefore, the higher the staining number, the better the fastness of the dye on the dyed fabric. It is noted that the small numerical differences seen between the Example 1 fabric and the Celliton Blue CF fabric actually represent a significant visual difference in the degree of staining.

| CO6 B2S Wash Fastness Test | | | | | | | | | | | | | | |
|---|---|---|---|---|---|---|---|---|---|---|---|---|---|---|
| | 1/1 Depth | | | | | | | 2/1 Depth | | | | | | |
| | CS | CA | Co | Pa | Pes | Pac | Wo | CS | CA | Co | Pa | Pes | Pac | Wo |
| Example 1 | 5 | 4 | 5 | 4 | 4/5 | 5 | 5 | 5 | 3/4 | 4/5 | 3/4 | 4 | 5 | 5 |
| Celliton Blue GF | 5 | 3/4 | 5 | 3/4 | 4 | 5 | 5 | 5 | 3 | 4/5 | 3 | 4 | 5 | 4/5 |

The CO6 B2S test is the same as the CO6 A2S test but uses a 50° C. wash instead of a 40° C. wash.

| EO1 Cold Water Test | | | | | | | | | | | | | | |
|---|---|---|---|---|---|---|---|---|---|---|---|---|---|---|
| | 1/1 Depth | | | | | | | 2/1 Depth | | | | | | |
| | CS | CA | Co | Pa | Pes | Pac | Wo | CS | CA | Co | Pa | Pes | Pac | Wo |
| Example 1 | 5 | 4/5 | 5 | 4/5 | 5 | 5 | 5 | 5 | 4 | 4/5 | 4 | 4/5 | 5 | 4/5 |
| Celliton Blue GF | 5 | 4/5 | 4/5 | 5 | 4/5 | 5 | 5 | 5 | 4 | 4/5 | 4 | 4/5 | 5 | 4/5 |

The EO1 cold water test involves wetting the dyed acetate fabric and undyed test fabric with deionised water, placing the wet dyed acetate fabric in contact with wet undyed test fabric, placing a weight on top of the two contacted fabrics, and measuring how much colour is transferred after rinsing.

| E04 Alkaline Perspiration Test pH8 | | | | | | | | | | | | | | |
|---|---|---|---|---|---|---|---|---|---|---|---|---|---|---|
| | 1/1 Depth | | | | | | | 2/1 Depth | | | | | | |
| | CS | CA | Co | Pa | Pes | Pac | Wo | CS | CA | Co | Pa | Pes | Pac | Wo |
| Example 1 | 5 | 5 | 5 | 5 | 5 | 5 | 5 | 5 | 4/5 | 5 | 4/5 | 4/5 | 5 | 5 |
| Cellinton Blue GF | 5 | 4/5 | 5 | 4/5 | 5 | 5 | 5 | 5 | 4 | 4/5 | 4 | 4/5 | 5 | 4/5 |

The EO4 test is the same as the above EO1 test except that an aqueous synthetic perspiration of alkaline pH replaces the deionised water of the EO1 test.

G01 Nitrogen Oxides Test

This test measures the resistance of the dye colour on cloth to fading caused by gas fumes. Again, 5 represents the best result, through to 1 which is the worst.

|  |  | 1 Cycle | 3 Cycles |
|---|---|---|---|
| Example 1 | 1/1 Depth | 5 | 4/5 |
|  | 2/1 Depth | 5 | 4/5 |
| Celliton Blue GF | 1/1 Depth | 5 | 4/5 redder |
|  | 2/1 Depth | 5 | 4 redder |

Example 2

Composition with Seven Dyes Including Blue Dye (VI)

A black dye composition was prepared comprising 12 parts of blue dye (II) and 25.5 parts of blue dye (III) along with the following dyes:
Orange dye (IV) 24.8 parts
Brown dye (V) 13.33 parts
Blue dye (VI) 14.4 parts
Red dye (VII) 7.25 parts
and Yellow dye (VIII) 2.73 parts
and 170 parts of a lignin sulphonate dispersing agent. This composition was used to dye a secondary cellulose acetate fabric to B/Dk depth by applying 4% by weight of fibre using the same method exemplified in Example 1. The dyeing depth and the fastness testing methods are defined in the same way as in Example 1. The fastness test results are compared with those obtained using three leading commercial black dye compositions for secondary cellulose acetate. Serisol is a trade mark of Yorkshire Chemicals, and Celliton is a trade mark of BASF.

|  | CS | CA | Co | Pa | Pes | Pac | Wo |
|---|---|---|---|---|---|---|---|
| C06 A2S Wash Fastness Test |  |  |  |  |  |  |  |
| Example 2 | 5 | 3/4 | 4/5 | 3/4 | 4 | 4/5 | 4/5 |
| Serisol Black BSNX03 Liquid 50 | 5 | 3/4 | 4/5 | 3 | 4 | 4/5 | 4/5 |
| Serisol Black BSN | 5 | 3/4 | 4/5 | 3 | 4 | 4/5 | 4/5 |
| Celliton Black GFG | 5 | 3/4 | 4/5 | 3 | 4 | 4/5 | 4/5 |
| EO1 Cold Water Test |  |  |  |  |  |  |  |
| Example 2 | 5 | 4 | 4 | 4 | 4 | 4/5 | 4/5 |
| Serisol Black BSNX03 Liquid 50 | 5 | 4 | 4 | 4 | 4 | 4/5 | 4/5 |
| Serisol Black BSN | 5 | 3/4 | 4 | 3/4 | 4 | 4/5 | 4/5 |
| Celliton Black GFG | 5 | 4 | 4 | 4 | 4 | 4/5 | 4/5 |
| EO4 Alkaline Perspiration Test pH8 |  |  |  |  |  |  |  |
| Example 2 | 5 | 4 | 4 | 4 | 4 | 4/5 | 4/5 |
| Serisol Black BSNX03 Liquid 50 | 5 | 4 | 4 | 4 | 4 | 4/5 | 4/5 |
| Serisol Black BSN | 5 | 3/4 | 4 | 3/4 | 4 | 4/5 | 4/5 |
| Celliton Black GFG | 5 | 4 | 4 | 4 | 4 | 4/5 | 4/5 |

| G01 Nitrogen Oxides Test |  |  |
|---|---|---|
|  | 1 Cycle | 3 Cycles |
| Example 2 | 4 | 3/4 |
| Serisol Black BSNX03 Liquid 50 | 4 | 3/4 |
| Serisol Black BSN | 4/5 | 4 |
| Celliton Black GFG | 4 | 3/4 |

| Light Fastness (Xenotest BO2) |  |
|---|---|
|  | Blue Scale Rating |
| Example 2 | 5 |
| Serisol Black BSNX03 Liquid 50 | 4 |
| Serisol Black BSN | 4 |
| Celliton Black GFG | 4/5 |

The light fastness test is an accelerated weathering test using a xeon lamp (white light) to simulate daylight and the fading of the dye colour caused by daylight. The higher the Blue Scale Rating, the lower the degree of fading.

Example 3

Composition with Seven Dyes Including Blue Dye (IX).

A black dye composition was prepared comprising 11.7 parts of blue dye (II) and 23.5 parts of blue dye (III) along with the following dyes:
Orange dye (IV) 23.2 parts
Brown dye (V) 12.3 parts
Blue dye (I) 19.8 parts
Red dye (VII) 7 parts
and Yellow dye (VMI) 2.5 parts
and 170 parts of a lignin sulphonate dispersing agent. The composition was used to dye a secondary cellulose acetate fabric to B/Dk depth by applying 4% by weight of fibre using the same method exemplified in Example 1. The dyeing depth and the fastness testing methods are defined in the same way as in Example 1. The fastness test results are compared with those obtained using three leading commercial black dye compositions for secondary cellulose acetate. Serisol is a trade mark of Yorkshire Chemicals, and Celliton is a trade mark of BASF.

|  | CS | CA | Co | Pa | Pes | Pac | Wo |
|---|---|---|---|---|---|---|---|
| C06 A2S Wash Fastness Test |  |  |  |  |  |  |  |
| Example 3 | 5 | 4 | 5 | 4 | 4/5 | 5 | 5 |
| Serisol Black BSNX03 Liquid 50 | 5 | 3/4 | 4/5 | 3 | 4 | 4/5 | 4/5 |
| Serisol Black BSN | 5 | 3/4 | 4/5 | 3 | 4 | 4/5 | 4/5 |
| Celliton Black GFG | 5 | 3/4 | 4/5 | 3 | 4 | 4/5 | 4/5 |
| EO1 Cold Water Test |  |  |  |  |  |  |  |
| Example 3 | 5 | 4 | 4/5 | 4 | 4/5 | 5 | 5 |
| Serisol Black BSNX03 Liquid 50 | 5 | 4 | 4 | 4 | 4 | 4/5 | 4/5 |
| Serisol Black BSN | 5 | 3 | 4/5 | 3/4 | 4 | 4/5 | 4/5 |
| Celliton Black GFG | 5 | 4 | 4 | 4 | 4 | 4/5 | 4/5 |
| EO4 Alkaline Perspiration Test pH8 |  |  |  |  |  |  |  |
| Example 3 | 5 | 4/5 | 5 | 4 | 5 | 5 | 5 |
| Serisol Black BSNX03 Liquid 50 | 5 | 4 | 4 | 4 | 4 | 4/5 | 4/5 |
| Serisol Black BSN | 5 | 3/4 | 4 | 3/4 | 4 | 4/5 | 4/5 |
| Celliton Black GFG | 5 | 4 | 4 | 4 | 4 | 4/5 | 4/5 |

The light fastness test is an accelerated weathering test using a xenon lamp (white light) to simulate daylight and the fading of the dye colour caused by daylight. The higher the Blue Scale Rating, the lower the degree of fading.

| GO1 Nitrogen Oxides Test | | |
|---|---|---|
| | 1 Cycle | 3 Cycles |
| Example 3 | 5 | 5 |
| Serisol Black BSNXO3 Liquid 50 | 4 | 3/4 |
| Serisol Black BSN | 4/5 | 4 |
| Celliton Black GFG | 4 | 3/4 |

Example 4

Synthesis of α-form of dye (III)

The preferred α-form of dye (III) is prepared in the following manner.

3-Amino-5-nitro-2,1-benzisothiazole (19.5 parts) are dissolved in 98% sulphuric acid (97.9 parts).

A solution of nitrosyl sulphuric acid is then prepared as follows:—7.7 parts of the sodium nitrite is added incrementally to 67.3 parts of 98% sulphuric acid at 20–30° C. The mixture is then heated and maintained at 70° C. until reaction is complete (approximately 20 minutes) before cooling the reaction mixture to 30° C.

The benzthiazole solution is cooled to 5° C. and the nitrosyl solution added maintaining the temperature at 0–5° C. Glacial acetic acid (24.4 parts) is then added portionwise to the above mixture, again maintaining the 0–5° C. temperature regime. The total mixture is then stirred at the same temperature for 5 hours to allow the diazotisation reaction to proceed to completion.

The coupling bath is prepared as follows:

Water (400 parts), sulphamic acid (2 parts), sodium acetate (50 parts), N-ethyl-N-[2-(methoxycarbonyl)ethyl] aniline (20.7 parts) and an ammonium salt of a sulphonated lignin (2.5 parts) are combined and stirred to produce a fine suspension of pH 5–6. This suspension is then cooled by the addition of ice (600 parts) to <0° C., before the diazo solution prepared above is added as in the following manner.

The diazotised benzothiazole solution is then added to the coupling bath over a period of 30 minutes maintaining the coupling bath at a pH of 4–5 using additions of 50% caustic soda solution as required. During the addition, the temperature is maintained at <0° C. After stirring for 30 minutes the pH of the coupling liquor is reduced to 2–2.5, by the addition of 36% hydrochloric acid, and the resultant azo dye slurry diluted to twice the volume with water. The diluted slurry is heated to 75° C. maintaining the pH at 2–2.5 by the addition of further 36% hydrochloric acid as needed. After 2 hours at this temperature, the dye solid is isolated by filtration. This procedure typically yields 81 parts of a water-wet paste (45% solids) of the α-modification of dye (III). The absence of β- and γ-modifications may be confirmed by X-ray crystallography or by the determination of the melting point by DSC.

Example 5

Comparative Tests of α-, β- and γ-forms of dye (III)

Cellulose diacetate cloth is conventionally dyed by Jig dyeing. In such an apparatus, where dyeing takes place typically at 75–85° C., the rate of transfer of the disperse dye to the cloth may be much lower than that experienced in the dyeing of polyester which is typically carried out at 130° C. The temperature sensitivity of a disperse dye preparation made from the α-form of dye (III) was compared with that of two commercially available dye preparations of (III) Palanil Dark Blue 3RT and Celliton Blue CA (both registered trade marks of and available from BASF), which are both composed of mixed β- and γ-forms of dye (III).

4 g pieces of a standard cellulose diacetate cloth were placed in 200 ml containers with the various dye preparations in quantities sufficient to provide a dyeing of 1/1 depth at full exhaustion. Depths of dyeing are defined in British Standard BS2661:SDG:1961 issued by the British Standards Institution in collaboration with the Society of Dyers and Colourists (ISO R105/1). To the cloth and the dye was added 80 ml water and 1 ml/l Dyapol BDN (Registered Trade Mark of and available from Yorkshire Chemicals), a dyebath dispersant. The pH of the mixture was adjusted to 4.5 using acetic acid, before the containers were sealed and heated in a Mathis Labomat infra-red dyeing machine for the following different times and temperatures:

1 hour at 65° C.
2 hours at 65° C.
1 hour at 75° C.
2 hours at 75° C.
1 hour at 85° C.

The dye containers were cooled to ambient temperature, opened, and the cellulose diacetate cloth pieces rinsed and dried, before the relative Integ values were determined by reflection. (The definition and measurement of Integ values is discussed in the paper: Value Analysis of Dyes—A New Method Based on Colour Measurement—Journal of the Society of Dyers and Colourists 96 p166–176, April 1980, by A. N. Derbyshire and W. J. Marshall) The relative Integ values are displayed below.

| Temp/Time | Palanil Dark Blue 3RT | Celliton Blue CA | α-form(III) |
|---|---|---|---|
| 1 hour/65° C. | 34 | 34 | 76 |
| 2 hours/65° C. | 52 | 48 | 96 |
| 1 hour/75° C. | 78 | 79 | 99 |
| 2 hours/75° C. | 89 | 90 | 100 |
| 1 hour/85° C. | 100 | 100 | 100 |

It is obvious from the Integ measurements that the dye preparation containing the α-form of dye (III) gives a more rapid build-up at the temperatures typical for the dyeing of acetate fibres and fabrics. Employment of the α-form of dye (III) for mixtures providing navy and black shades on cellulose triacetate gives faster build-up of colour which is more on tone than if the β- or γ-forms or mixtures of the different forms is employed. Machine productivity and robustness of the dyeing method are thus enhanced by the use of the α-form of dye (III).

What is claimed is:

1. A dye composition for dyeing fibres comprising (a) an azo dye of the formula (II):

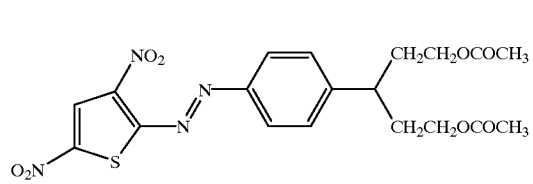

and (b) an azo dye of the formula (III):

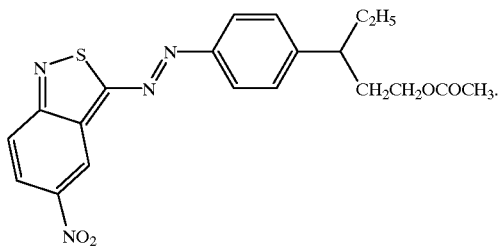

(III)

2. A dye composition as claimed in claim 1, wherein the dye composition comprises from 20% to 80% of dye (II) and from 20% to 80% of dye (III), by weight of the total amount of dyes (II) and (III) in the composition.

3. A dye composition as claimed in claim 1, wherein some or all of the dye (III) is present in an α-form characterised substantially by an X-ray diffraction graph ($CuK_\alpha$ radiation) having a characteristic line of strong intensity of a diffraction angle 2θ of 25.5°, and lines of medium intensity at diffraction angles of 5.9°, 12.1°, 13°, 14.2°, 15.9°, 17.8°, 18.4°, 24.1°, 26° and 28°.

4. A dye composition as claimed in claim 3, wherein ≧50% of the dye (III) is present in the α form.

5. A dye composition as claimed in claim 3, wherein ≧95% of the dye (III) is present in the α-form.

6. A dye composition as claimed in claim 1, wherein the dye (III) comprises the β-form and/or the γ-form of the dye.

7. A dye composition as claimed in claim 1, wherein the dye (III) is present in the β-form and/or the γ-form of the dye.

8. A dye composition as claimed in claim 1, wherein the dye composition additionally comprises an azo dye of the formula (VI) and/or an azo dye of the formula (IX):

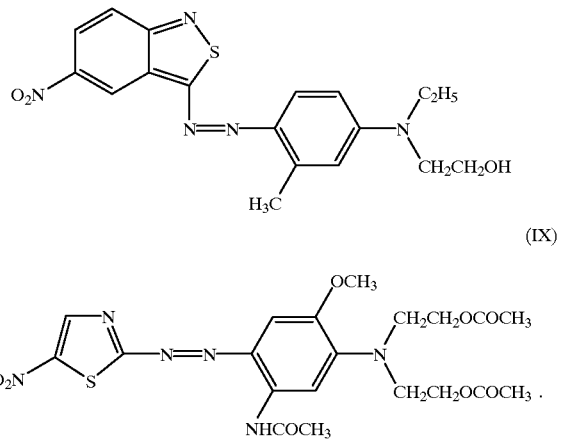

(VI)

(IX)

9. A dye composition as claimed in claim 8, wherein the dye composition comprises from 20% to 70% of dye (VI) or of dye (IX) or of the total weight of dyes (VI) and (IX), by weight of the total weight of dye (II) and dye (III) in the composition.

10. A dye composition as claimed in claim 1, wherein the dye composition comprises one or more additional dyes (preferably azo dyes) adapted to give the dye composition and/or fibres with which the composition comes into contact a black shade.

11. A dye composition as claimed in claim 10, wherein the one or more additional dyes include the orange dye of formula (IV), the brown dye of formula (VI), the red dye of formula (VII) and/or the yellow dye of formula (VII), and/or a salt or salts thereof:

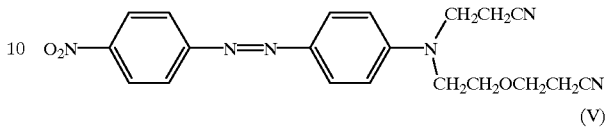

(IV)

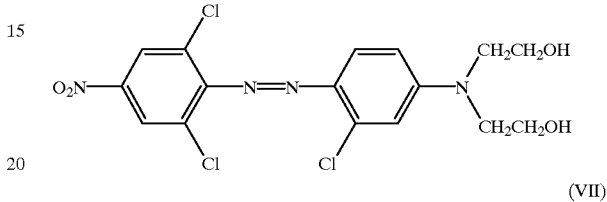

(V)

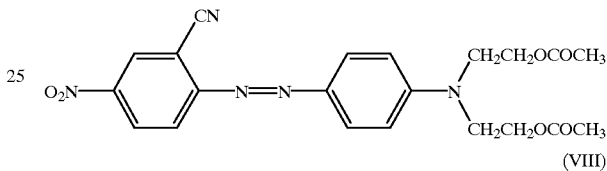

(VII)

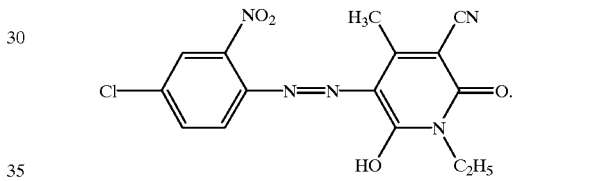

(VIII)

12. A dye composition as claimed in claim 1, wherein the dye composition contains from 10 to 50% of dyes by weight of the total weight of the dry ingredients of the composition, and/or additionally contains from 50 to 90% of a dispersant or a plurality of dispersants by weight of the dry ingredients of the composition.

13. A dye composition as claimed in claim 1 containing between 0 and 90 wt % water.

14. A method of making a dye composition according to claim 1, comprising mixing the dyes together.

15. A method as claimed in claim 14, wherein the dyes are mixed in the weight ratios stated in claim 2.

16. A dye bath composition comprising a dye composition according to any one of claims 1 to 13 and water.

17. A method of dyeing fibres comprising contacting fibres with a dye composition as defined in claim 1 in a dye bath.

18. A method as claimed in claim 17, wherein after the fibres have been introduced into the dye bath, the dye bath is gradually heated to 60–100° C.

19. A method as claimed in claim 17, wherein after removing the fibres from the dye bath, the fibres are reduction cleared, rinsed, dried and/or stentered.

20. Fibres and/or a textile material dyed using a dye composition, dye bath composition and/or method of dyeing as defined in claim 1.

21. Fibres and/or a textile material as claimed in claim 20, wherein the fibres and/or textile material comprise cellulose acetate fibres or blends thereof with other natural and/or synthetic fibres.

22. A method of making an α-form of an azo dye of the formula (III)

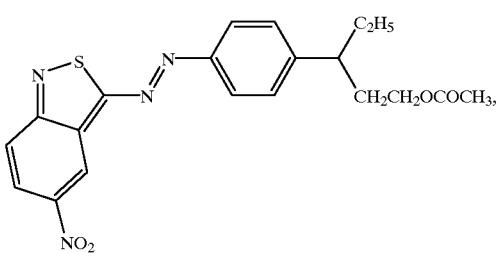

(III)

wherein the α-form is characterised substantially by an X-ray diffraction graph (CuK$_\alpha$ radiation) having a characteristic line of strong intensity at a diffraction angle 2θ of 25.5°, and lines of medium intensity at diffraction angles of 5.9°, 12.1°, 13°, 14.2°, 15.9°, 17.8°, 18.4°, 24.1°, 26° and 28°;

the method comprising the steps of:

(a) reacting 3-amino-5-nitro-2,1-benzothiazole or a salt thereof with a diazotising agent, and (b) coupling the diazotised benzothiazole with N-ethyl-N-[2-(methoxycarbonyl)ethyl]aniline or a salt thereof.

23. A method as claimed in claim 22, wherein the diazotising agent comprises nitrosyl sulfuric acid.

24. A method as claimed in claim 22, wherein step (a) is carried out in a solvent which comprises sulfuric acid and/or at a temperature of −20 to 5°.

25. A method as claimed in claim 22, wherein in step (b) the diazotised benzothiazole is added gradually to a reaction vessel containing the N-ethyl-N-[2-(methoxycarbonyl)ethyl]aniline or the salt thereof.

26. A method as claimed in claim 25, wherein the temperature is maintained at ≦0° C. during the gradual addition.

27. A method as claimed in claim 25, wherein the pH is substantially maintained at between 3 and 6 during the gradual addition.

28. A method as claimed in claim 25, wherein after the gradual addition, the reaction mixture is acidified and/or heated to ≧25° C.

29. A method of making a dye composition as defined in claim 3, the method comprising the steps of:

(a) making an α-form of the dye (III) or of a salt of the dye as defined in the method of claim 22, and (b) mixing said α-form of dye (III) or salt thereof with one or more dyes including dye (II) or a salt thereof as defined in claim 1.

* * * * *

UNITED STATES PATENT AND TRADEMARK OFFICE
CERTIFICATE OF CORRECTION

PATENT NO.   : 6,365,718 B1
DATED        : April 2, 2002
INVENTOR(S)  : Christopher Whitham, Alan John Buckley and Rebecca Jane Crowson It is certified that error appears in the above-identified patent and that said Letters Patent is hereby corrected as shown below:

Column 1,
Line 17, replace "alkl or alkenyl" with -- alkyl or alkenyl --

Column 2,
Line 10, replace "of the formula (II)" with -- of the formula (III) --

Column 3,
Line 60, replace "black shade These" with -- black shade. These --

Column 4,
Line 25-30, replace " 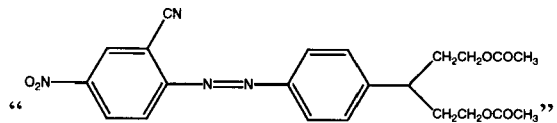 "

with -- 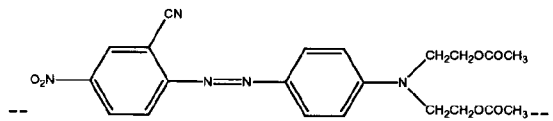 --

Column 6,
Lines 16-17, replace "preferably 24 50%" with -- preferably $\geq$ 50% --

Column 10,
Line 15, replace "a xeon lamp" with -- a xenon lamp --
Lines 30-32, replace "Blue dye (I)" with -- Blue dye IX -- and "Yellow dye (VMI)" with -- Yellow dye (VIII) --

Column 11,
Line 26, replace "benzthiazole" with -- benzothiazole --

Column 12,
Line 30, replace "Colourists 96 p 166" with -- Colourists <u>96</u> p 166 --

Column 14,
Lines 3-4, replace "brown dye of formula (VI)" with -- brown dye of formula (V) --;
replace "yellow dye of formula (VII)" with -- yellow dye of formula (VIII) --

UNITED STATES PATENT AND TRADEMARK OFFICE
CERTIFICATE OF CORRECTION

PATENT NO.   : 6,365,718 B1
DATED        : April 2, 2002
INVENTOR(S)  : Christopher Whitham, Alan John Buckley and Rebecca Jane Crowson It is certified that error appears in the above-identified patent and that said Letters Patent is hereby corrected as shown below:

Column 15,
Lines 4-12, replace

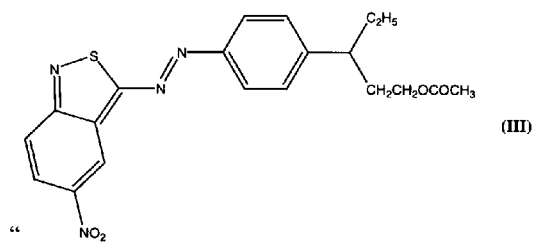

"                                                              "

with

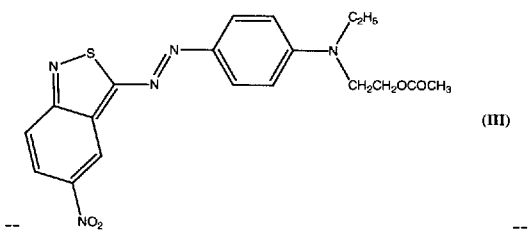

--                                                              --

Signed and Sealed this

Eleventh Day of March, 2003

JAMES E. ROGAN
*Director of the United States Patent and Trademark Office*